(No Model.)

C. A. DAVIS.
TOOTH CROWN ATTACHMENT.

No. 553,394. Patented Jan. 21, 1896.

Witnesses:
L. C. Hills.
W. S. Van Loan.

Inventor:
Charles A. Davis,
by Franklin H. Hough
Atty.

UNITED STATES PATENT OFFICE.

CHARLES ATWATER DAVIS, OF PASADENA, CALIFORNIA.

TOOTH-CROWN ATTACHMENT.

SPECIFICATION forming part of Letters Patent No. 553,394, dated January 21, 1896.

Application filed September 26, 1895. Serial No. 563,782. (No model.)

*To all whom it may concern:*

Be it known that I, CHARLES ATWATER DAVIS, a citizen of the United States, residing at Pasadena, in the county of Los Angeles and State of California, have invented certain new and useful Improvements in Tooth-Crown Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in mounting tooth-crowns; and it consists in an artificial tooth having a suitable recess in its inner end to receive a shoulder upon the pin and a hole which extends from the recess any desired distance into the tooth, combined with a pin having a shoulder that is concaved upon both of its sides at any suitable point between its ends, and suitable corrugations or irregularities along the pin upon each side of the shoulder, as will be more fully described hereinafter.

The object of my invention is to provide the pin with an enlarged central portion that is concaved on both sides, and which central portion is recessed into both crown and root, so as to bind them rigidly together.

Figure 1:
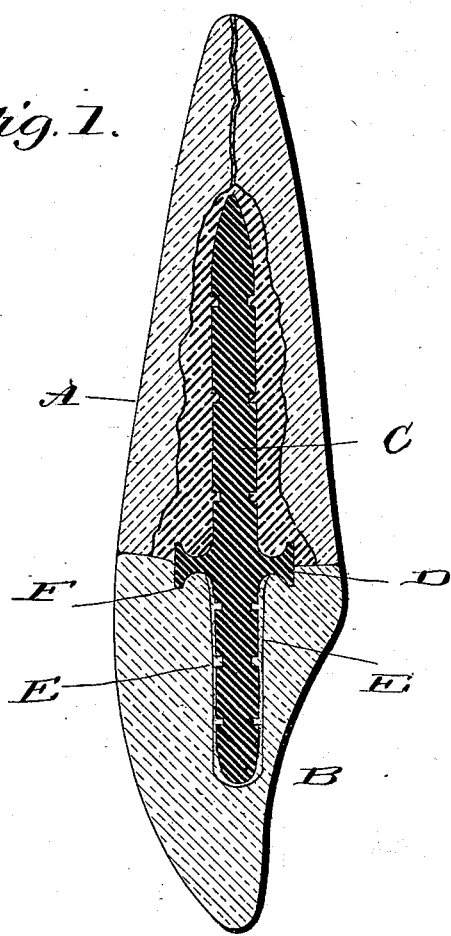
Figure 2:
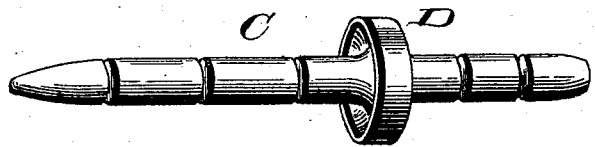

In the accompanying drawings, Figure 1 is a vertical section taken through a crown-tooth and the root to which it is attached. Fig. 2 is a side elevation of the pin alone.

A represents a natural tooth or root of a tooth in the mouth; B, the crown-tooth, and C the pin by which the crown-tooth is secured to the root in the mouth or to a bridge or plate.

In the manufacture of the crown-tooth a recess corresponding in shape and size to the shoulder D upon the pin is made in the base of the tooth, and a canal or hole E is made into the tooth from this recess, and this canal or hole is preferably slightly tapered or enlarged from the base of the tooth to the bottom of the hole. The shoulder upon the tooth is made nearer to that end which is to be inserted into the crown-tooth than to the one which is to be inserted in the root, and both ends of the pin and the shoulder are preferably made round and of such size as is best adapted for the purpose. The shoulder not only gives strength to the tooth, but forms a large bearing on the base, so as to securely hold and retain the low-fusing porcelain which is used to secure the pin to the crown. The cavity or recess F in the base of the tooth is made to correspond nicely to the shape and size of the shoulder, so that when the shoulder is in position it forms a large bearing for the crown and braces and supports it rigidly in position upon the pin. It will be observed that the enlargement D of the pin is provided at each of its ends with a T or cup shaped head D', which serves to furnish a greater holding-surface for the porcelain in the crown and the cement in the root of the tooth, giving greater strength than could be otherwise obtained.

Both ends of the pin are provided with corrugations or irregularities of any desired shape, so that the cement and porcelain used in securing the pin in place will catch it and bind the parts so securely together that they cannot become accidentally separated. As here shown, angular-shaped grooves extend around the pin, but any other shapes desired will answer the same purpose. Any suitable cement may be used, or low-fusing porcelain, which is then subjected to a low degree of heat after the pin has been inserted in position in the crown. That end of the pin which is to be inserted into the root is made slightly tapering, so as to correspond to the shape of the nerve-canal of the root.

Having thus described my invention, what I claim to be new, and desire to secure by Letters Patent, is—

A pin for securing tooth crowns to roots consisting of a straight body portion that is provided with grooves at both ends, and an enlarged central portion or shoulder that is concaved on both of its sides, combined with a porcelain crown recessed at its base so as to receive the concave shoulder of the pin, substantially as shown and described.

In testimony whereof I affix my signature in presence of two witnesses.

CHARLES ATWATER DAVIS.

Witnesses:
WILLIAM T. VAN LOAN,
FRANKLIN H. HOUGH.